United States Patent
Tidestav et al.

(10) Patent No.: US 11,044,642 B2
(45) Date of Patent: Jun. 22, 2021

(54) DATA TRANSMISSION DURING HANDOVER (71) Applicant: Telefonaktiebolaget LM Ericsson (publ), Stockholm (SE)

(72) Inventors: Claes Tidestav, Bålsta (SE); Edgar Ramos, Kirkkonummi (FI); Andres Reial, Malmö (SE); Johan Rune, Lidingö (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/339,097

(22) PCT Filed: Oct. 11, 2016

(86) PCT No.: PCT/CN2016/101807
§ 371 (c)(1),
(2) Date: Apr. 3, 2019

(87) PCT Pub. No.: WO2018/068204
PCT Pub. Date: Apr. 19, 2018

(65) Prior Publication Data
US 2019/0239129 A1    Aug. 1, 2019

(51) Int. Cl.
*H04W 4/00* (2018.01)
*H04W 36/00* (2009.01)
(Continued)

(52) U.S. Cl.
CPC ....... *H04W 36/0033* (2013.01); *H04W 36/28* (2013.01); *H04W 36/24* (2013.01)

(58) Field of Classification Search
CPC . H04W 36/0033; H04W 36/28; H04W 36/24; H04W 36/18
(Continued)

(56) References Cited

U.S. PATENT DOCUMENTS

| 2003/0211848 | A1* | 11/2003 | Rajkotia | H04W 28/24 455/436 |
| 2003/0223422 | A1* | 12/2003 | Igarashi | H04L 1/1642 370/390 |

(Continued)

FOREIGN PATENT DOCUMENTS

| CN | 101001102 A | 7/2007 |
| CN | 102638877 A | 8/2012 |

OTHER PUBLICATIONS

International Search Report and Written Opinion of the International Searching Authority, PCT/CN2016/101807, dated Jul. 20, 2017, 7 pages.
(Continued)

*Primary Examiner* — Mang Hang Yeung
(74) *Attorney, Agent, or Firm* — Sage Patent Group (57) ABSTRACT

The present invention relates to handling data transfer during handover, whereby a terminal device is initially connected to a serving access node and a handover is performed to connect the terminal device to a target access node. The improved handling of data transfer is achieved by upon making a handover decision, performing data rerouting to the target access node while continuing to exchange data between the terminal device and the serving access node, and stopping the data exchange between the terminal device and the serving access node in response to an indicator indicating that the target access node is ready to proceed with the handover.

12 Claims, 10 Drawing Sheets

(51) Int. Cl.
*H04W 36/28* (2009.01)
*H04W 36/24* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 2003/0224786 | A1* | 12/2003 | Lee | H04W 36/02 455/432.1 |
| 2008/0267131 | A1* | 10/2008 | Kangude | H04W 36/0072 370/331 |
| 2009/0059829 | A1 | 3/2009 | Bachmann et al. | |
| 2009/0124259 | A1* | 5/2009 | Attar | H04L 47/14 455/436 |
| 2013/0201959 | A1 | 8/2013 | Guo et al. | |
| 2014/0370886 | A1* | 12/2014 | Lisak | H04W 36/0022 455/426.1 |
| 2015/0126197 | A1* | 5/2015 | Lee | H04W 4/14 455/437 |
| 2016/0262066 | A1 | 9/2016 | Ozturk et al. | |
| 2018/0098250 | A1* | 4/2018 | Vrzic | H04W 36/0016 |

OTHER PUBLICATIONS

European Search Report for European Application No. 16918732.5, dated May 6, 2020, 12 Pages.
Intel, "Introduction of RACH-less and make before break", 3GPP TSG-RAN2 Meeting 95bis Kaohsiung, Oct. 10-14, 2016; R2-166250, XP051150845, 9 pages.
Intel, "Remaining Issues for Make Before Break", 3GPP TSG-RAN WG2 Meeting #95bis, Kaohslung, Oct. 10-14, 2016, R2-166252, XP051150847, 2 Pages.

* cited by examiner

DATA TRANSMISSION DURING HANDOVER

CROSS REFERENCE TO RELATED APPLICATIONS

This application is a 35 U.S.C. § 371 national stage application of PCT International Application No. PCT/CN2016/101807 filed on Oct. 11, 2016, the disclosure and content of which is incorporated by reference herein in its entirety.

TECHNICAL FIELD

The present invention generally relates to wireless communications, and particularly relates a method(s), a terminal device, an access network node, a computer-readable storage medium, a computer program, and a carrier containing the computer program for handling data transfer during handover.

BACKGROUND

Handover is an important part of any mobile communications system. In legacy systems, handover is the process of transferring an ongoing connection of a user terminal (UE) from one base station $eNB_S$ (the source) to another base station $eNB_T$ (the target), or from one cell to another within the same base station eNB. This is done to accomplish a transparent service or service continuity over a larger area. The handover should happen without any loss of data and preferably with no interruption.

In legacy cell-based systems like LTE, the so-called cell-specific reference signals (CRSs) are used for mobility measurements. These are broadcasted in all neighbor cells in an always-on manner, regardless of the presence or position of UEs in the system. The CRS are easy to measure and yield consistent results, but static CRS transmission leads to high resource usage, power consumption and constant inter-cell interference generation in the downlink. All base stations continuously transmit pilot signals that UEs in their own and neighbor cells use to estimate the target cell quality and timing. This is also true in GSM (BCCH), WCDMA (CPICH) and in WiFi (beacon). The UEs perform periodic measurements and report the measurements to the network when certain reporting conditions are met (periodic or event based). If it is detected that the other cell is getting better than the source cell, e.g. because the signal from the other cell is received with a higher power and/or better quality, a handover procedure may be initiated.

The legacy procedures rely on averaging measurements over relatively long times, in the order of a few hundred milliseconds. L3 signaling is used for the communication between the UE and the network, both for measurement reporting and for handover commands and acknowledgements.

When a UE is handed over to a new base station, the source base station $eNB_S$ has to forward to the target base station $eNB_T$ any buffered user data or data arriving to the source base station while the handover process is ongoing. In addition, as part of the handover process, the network must reroute the user plane data path to the new serving access node, i.e. the target base station $eNB_T$, before the communication with the UE can continue. In legacy systems, this rerouting is relatively fast, compared to the procedures that precede the handover.

The core network nodes that are involved in the rerouting of packets are called the MME (Mobility Management Entity) and SGW (Serving Gateway). To initiate the rerouting of packets, the MME sends a Modify Bearer Request to the SGW. When the SGW receives the Modify Bearer Request, it starts sending DL packets to the target eNodeB $eNB_T$. In order to assist the reordering function in the target eNodeB, the SGW sends on or more "end marker" packets to the (old) serving eNodeB $eNB_S$, immediately after switching the path to the target eNodeB. This is described in 3GPP TS 23.401 V14.0.0, see FIG. 5.5.1.1.2-1. The SGW must not send any packets on the old path after it has sent the "end marker". When the serving eNodeB $eNB_S$ receives the end marker, it forwards it to the target eNodeB $eNB_T$, which initiates the processing necessary to maintain in-sequence delivery of user data forwarded over the X2 interface and user data received over the S1 interface from the SGW.

In UMTS, during a handover procedure an "Activation Time" is signaled to the UE in the Physical Channel Reconfiguration message (see 3GPP TS 25.331 V10.3.3.1). The Activation Time controls the frame number at which the operation caused by the related message shall take effect, in other words, how long the UE should wait before moving to the new cell. It can be set between 0 and 255, and indicates the absolute value of the CFN (Connection Frame Number) at which the UE should perform the handover.

In more detail, when a UE sends a measurement report triggered by event D1 (detected stronger cell than serving from the active set after applying all the filters and a hysteresis), then the network (serving radio network controller (RNC)) may decide to trigger a handover to the new stronger cell. There are two types of handover commands, one is issued by RNC using RRC signalling using the source cell and the other is transmitted in MAC level using the HSCCH channel by the target cell. Each procedure has a difference sequence and messages but both of them use the above "Activation time" in a similar way. The description below is related to the first type of handover command. It is noted here that the term handover command is used in the present description, but it should be noted that the actual command transmitted may be referred to as TRANSPORT CHANNEL RECONFIGURATION or PHYSICAL CHANNEL RECONFIGURATION in the standard.

Here, the activation time is included in the handover command. The activation time is comprised of a value between 0 and 255, and indicates the absolute value of the CFN (Connection Frame Number) at which the UE should apply the new configuration. The CFN is calculated by the UE from the SFN (System Frame Number), which is broadcast by the network. Once the CFN equals the activation time, the UE stops monitoring the HSSCCH and HSDSCH of the serving cell and starts monitoring these channels from the target cell, thus following the configuration given by the handover command.

After L1 synchronisation has been established, the UE sends a RECONFIGURATION COMPLETE message. The serving RNC then terminates reception and transmission on the old radio link for dedicated channels and releases all resources allocated to the considered UE in the source NodeB if needed.

Once the network has transmitted a RECONFIGURATION message to the UE it expects that the handover will be executed and there is no mechanism to cancel such action if, for example, the UE reports a better cell link during the time before the activation time.

SUMMARY OF THE INVENTION

Problems with Existing Solutions

In legacy systems, the handover process is relatively slow. The whole process from when the channel quality becomes bad to when the connection is established with the new access node is several hundred milliseconds. Moreover, the process relies on that communication can be maintained with the old source access node for the major part of the process: both measurement reporting and handover commands are transmitted to/from the old source node. This in many cases leads to losses of signaling messages and failed handovers. This effect is expected to become even worse in 5G networks where data coverage is provided using beamforming, and the signal quality decreases rapidly as the UE moves outside the serving beam coverage area.

To solve these issues, several methods have been devised to speed up the handovers. Relying more on L1 signaling and directly connecting to the target access node are examples of such improvement steps. Thereby, it is possible to reduce the handover delay significantly.

As the duration of the measurement and signaling related to the handover process have been significantly reduced, the delay to reroute the data is now becoming significant. It may therefore be the case now that the UE has been successfully handed over to the target cell (target access node), but cannot receive data since it is not yet available in the target access node. This will cause an unwanted interruption in the data transfer. The importance of reducing this interruption is emphasized, for example, by the fact that in some proposed ITU and 3GPP Targets for the IMT-2020 requirements, [0] ms is proposed as the handover interruption time. Here, the handover interruption time is defined as the time duration during which a UE cannot exchange user plane packets with any base station. The handover interruption time includes the time required to execute any radio access network procedure, radio resource control signaling protocol, or other message exchanges between the user equipment and the radio access network.

Relying on the UMTS solution, i.e. to allow the data transmission to continue for a fixed period of time after the handover decision has been made, will be inflexible, since the rerouting delay may be different for different handovers. Moreover, in the UMTS solution as described above, it is not possible for the network to cancel the handover once the handover command has been transmitted.

There is thus a need to improve the handover process in order to reduce the delay due to user plane rerouting.

Solution

Accordingly, it is an object of the present invention to solve the above described problems. To overcome the disadvantages of the above described disadvantage the present invention introduces a mechanism for handling data transfer during handover.

Suitable methods, a network access node, a terminal device, a computer-readable storage medium, a computer program, and a carrier containing the computer program are defined in the independent claims. Advantageous embodiments are defined by the dependent claims.

In one embodiment, a method is defined in a wireless communication network for handling data transfer during handover of a terminal device between a serving access node and a target access node, comprising the steps of: upon making a handover decision, performing data rerouting to the target access node while continuing to exchange data between the terminal device and the serving access node; and stopping (S1500) the data exchange between the terminal device and the serving access node in response to an indicator indicating that the target access node is ready to proceed with the handover.

In a further embodiment, a method is defined in a terminal device for handling data transfer during access node handover, comprising the steps of: upon making a handover decision, continuing to exchange data between the terminal device and a serving access node; and stopping data exchange between the terminal device and the serving access node in response to an indicator indicating that the target access node is ready to proceed with the handover.

In another embodiment, a network node and a terminal device are respectively defined which are adapted to perform the above methods. In still further embodiments, a corresponding computer-readable storage medium, computer program, and carrier containing the computer program are defined.

BRIEF DESCRIPTION OF THE DRAWINGS

The embodiments herein will now be further described in more detail in the following detailed description by reference to the appended drawings illustrating the embodiments and in which.

DETAILED DESCRIPTION

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

Here, the terminal device (which is also referred to as UE in the following) may be a mobile or a fixed terminal device. The terminal device is a wireless terminal device, and may be a (fixed or mobile) user device (UE) or a MTC device, for example a "self-driving car", capable of having a radio access, for example over one or more radio access technologies, to one or more base station (eNB). Further, the serving access node and the target access node (base station) is a radio access network node of a wireless communication network, in particular a radio access node for providing a radio access to the terminal device, and also has a coverage area (including based on the beam-forming process) in which it may provide the radio access. It is also noted that the base station may also support multiple radio accesses, such as the LTE Evolution radio access technology and the 5G radio access technology (NR). Such a radio access may be of any spectrum or standard (GSM, GPRS, 3G, 4G, LTE, 5G, NR, WiFi, even DECT, etc.). Furthermore, the radio access network (RAN) node may be connected with a core network node (such as the MME) and/or other RAN nodes, as explained above.

Figure 1:
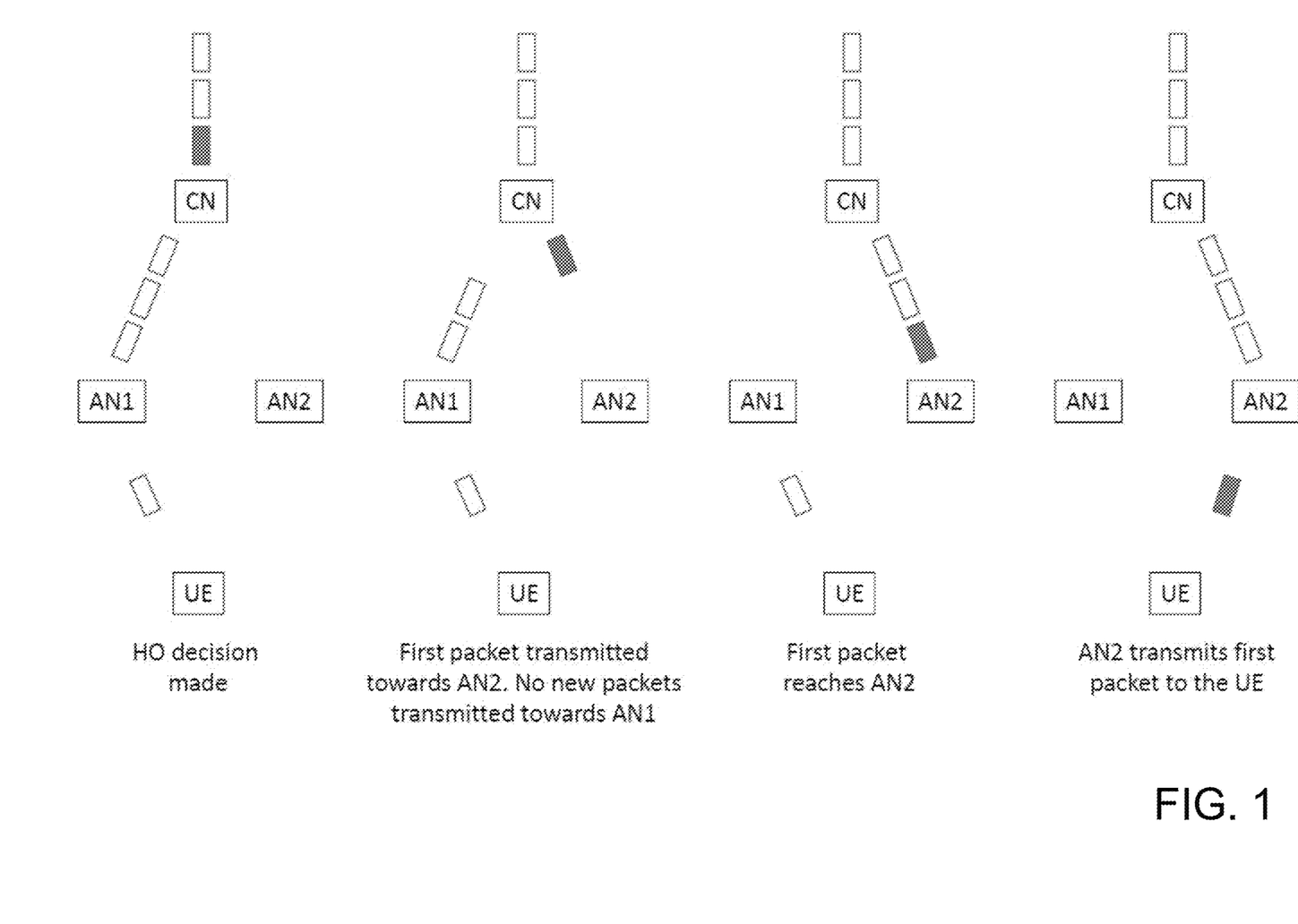
FIG. 1 is a schematic diagram of handling data transfer during handover according to an embodiment.

A central concept of the present invention is that the data transfer is allowed to continue from/to the source access node (e.g. source beam) to the terminal device (UE) also for some time after the network and the UE have agreed to transfer the connection to a certain target access node (e.g. target beam). After this time has passed, the UE switches to the target node (e.g. a target beam) and receives the data which has now been rerouted. An exemplary embodiment of this general concept is schematically illustrated in FIG. 1. In particular, after the handover (HO) decision has been made in a situation in which the data packet flow initially occurs from the core network (CN) to the UE via a source access node (AN1), the CN starts to transmit packets towards the target access node (AN2) while continuing to transmit packets to the source access node AN1. As soon as the first packet reaches the target access node (AN2) due to this rerouting process, the UE connects to the target access node (AN2) so that the AN2 starts to transmit the rerouted packets to the UE. Based on such a coordinated switch between the access network nodes and the UE, an unwanted interruption in the data transfer during HO is avoided.

Figure 2:
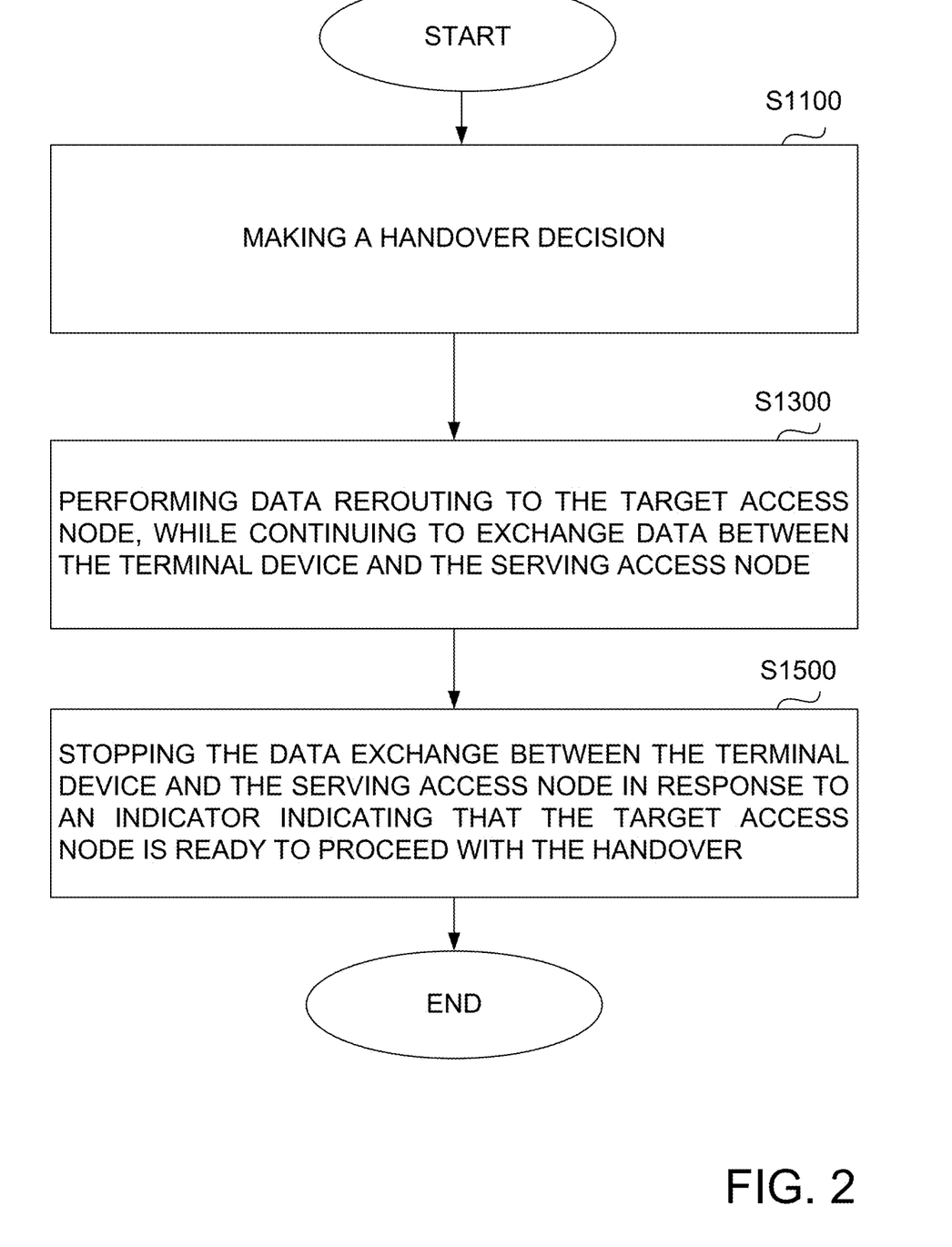
FIG. 2 is a schematic flow diagram illustrating an embodiment of a method for handling data transfer during handover in a wireless network.

FIG. 2 illustrates a flow diagram of a method of handling data transfer during handover according to an embodiment. Here, the method is performed in a wireless network in which a terminal device 10 is initially connected to a serving access node 20 and a data transfer occurs between the terminal device 10 and the serving access node 20, and subsequently a handover is performed so that the terminal device 10 may connect to a target access node 30 and a data transfer occurs between the terminal device 10 and the target access node 30. As such, the handover of the terminal device 10 is performed between the serving access node 20 and the target access node 30.

According to the flow diagram of FIG. 2, a handover decision is made in a first step S1100. This decision to initiate handover (HO) may be made by the wireless network (e.g. the serving access node 20 or a core network node 40) to initiate a network controlled handover process, or may be made by the terminal device 10, when it is decided that a handover is required. This process may involve determining a specific target access node 30 to which the data transfer, which is initially performed between the terminal device 10 and the serving access node 20, is handed over. It is noted here, that the concept of the present invention is also applicable to a dual connectivity scenario where a first and second access node is used. In other words, the present concept may also be employed for data flow control via a master and secondary base station (in the dual connectivity scenario).

The handover decision is thus made with regard to the target access node 30, and a corresponding handover command may be sent either from the source access node 20 or from the target access node 30 to the terminal device 10. As will be further detailed below, the handover command may include information such as MAC ID, a PRACH configuration at the target access node and/or timing advanced (TA), which should to be used when communicating and/or synchronizing with the target access node 30.

Upon making the handover decision in step S1100, the method according to FIG. 2 includes, in step S1300, a data rerouting process to the target access node 30 while data are continuously exchanged between the terminal device 10 and the serving access node 20. The continued exchange of data (data packets) between the terminal device 10 and the serving access node 20 may involve sending of data packets at the serving access node 20 and receiving the data packets at the terminal device 10. As illustrated above in FIG. 1, such a rerouting of data may involve rerouting all data packets newly received at, for example, the core network node 40, toward the target access node 30, while the transfer of data packets toward the serving access node 20 is continued. It may also involve a rerouting of all the newly received data packets toward the target access node 30, while the transfer of a copy of the data packets toward the serving access node 20 is continued.

The method according to FIG. 2 further includes a step S1500 according to which the data exchange between the terminal device 10 and the serving access node 20 is stopped in response to an indicator which indicates that the target access node 30 is (or becomes) ready to proceed with the handover. In other words, when the indicator is made available to the UE 10, the UE acts and may stop receiving data in response to that. Here, the indicator may, for example, indicate that data (data packet) is available or becomes available at the target access node 30. That is, in response to the indicator the serving access node 20 stops sending further data packets to the terminal device 10, for example stops new downlink (DL) data transmission. Subsequently, the terminal device 10 accesses the target access node 30 and a data exchange (data transfer) between the terminal device 10 and the target access node 30 is started. This subsequent process may be initiated by a switch command which is transmitted to the terminal device 10 via or from the source access node 20, for example via a beam sent from the source access node 20. Upon reception of this switch command message, the UE will stop transmitting/receiving new data to/from the source access node 20 (e.g., stops new uplink (UL) transmissions) and will start receiving data from the target access node 30.

As will be further illustrated below, the switch command may be transmitted upon expiry of a timer indicating that data is available or becomes available at the target access node 30. In addition or alternatively, the switch command may be transmitted upon receiving signaling (first indicator) from the target access node 30 at the serving access node 20 or from a core network node 40 to the serving access node 20. Here, the signaling transmitted from the target access node 30 to the source access node 20 indicates that the target access node 30 has data available for transmission to the terminal device 10, for example when the first data packet of the rerouted data has been received at the target access node 30. The signaling transmitted from a core network element 40 to the serving access node 20 may indicate to the serving access node 20 when the core network node 40 will forward no more data to the serving access node 20, and thus indicates that data becomes available at the target access node 30.

Upon reception of such a final data indictor, the serving access node 20 stops transmission of new DL data and sends the above described switch command to the terminal device 10. Such a coordinated switching of a network-controlled handover process may thus initiate the access node switching even before the data are actually becoming available so that the terminal device 10 connects to the target access node 30 in time with when the rerouted data is available at the target access node 30.

The above indicator indicating that the target access node 30 is (or becomes) ready to proceed with the handover, for example indicating that data is or becomes available at the target access node 30, may also or alternatively be provided by a timer (second indicator), in particular the expiration of a timer. Here, a first timer may be provided at the serving access node 20. As long as the timer is running, the serving access node 20 continues to send data (data packets) to the terminal device 10 in DL while the terminal device 10 also sends data to the serving access node 20 in UL. Once the first timer expires, the serving access node 20 stops sending/receiving new data (packets) and the switch command is transmitted to the terminal device 10. In response to the switch command, as described above, the terminal device 10 may start to listen to the target access node 30, for example once finishing the retransmissions with the serving access node 20. Once data is available in the target access node 30, the target access node initiates the communication which may thus proceed without interruption because the terminal device 10 has already connected or immediately connects to the target access node 30.

In a preferred embodiment, the first timer may be a common timer between the terminal device 10 and the serving access node 20. Based on such a common timer, which is implemented in both the terminal device 10 and the serving access node 20, the serving access node 20 and the terminal device 10 may follow a synchronized procedure to switch simultaneously the connection. The common timer may be started when making the handover decision, for example based on the handover command, and the expiration time of the common timer (second indicator) may be set to be synchronized according to a common time reference system in order to expire at the same time or by calculating possible misalignments in advance.

In another preferred embodiment, the second indicator may further be provided by a second timer in the serving access node 30, in particular the expiration of this second timer. Here, the target access node 30 may initiate the communication with the terminal device 10 once the second timer expires. By choosing a suitable value for the second timer, it is possible to ensure that no data is transmitted towards the terminal device 10 before the UE is ready to receive it.

In another preferred embodiment, the first indicator is transmitted to the terminal device 10 before the first timer expires, in particular when data become available at the target access node 30 before the first timer expires and thus the time to switch the connection is reached according to the first timer. Under such a condition, an explicit indication may be sent to the terminal device 10 via the serving access node 20 to speed up the handover process and to further suppress the interruption in the data transfer.

According to another preferred embodiment, the method of handling data transfer during handover of the terminal device 10 may further comprise the step of transmitting a third indicator to the terminal device 10, whereby the third indicator instructs the terminal device 10 to abort the handover process. Here, the third indicator may be an explicit indication transmitted by signaling via the serving access node 20 or the target access node 30 to the terminal device 10. Such a mechanism to abort or stop the handover process may be required if the network discovers, for example, that the selected target access node 30 is not appropriate any more. The network, for example the serving access node 20, may thus decide to abort the handover by notifying the terminal device. The terminal device 10 may, in turn, cancel the set timer and keep the connection to the currently connected access node (current connection to the serving access node 20 shall remain) if not indicated otherwise by an overriding handover procedure to a different target access node. As such, an explicit indication via the source access node 20 may be used to abort the handover process completely. This may be required if the network discovers that the selected target access node is not any more appropriate, for example because the UE 10 reports a better cell link before the starting of the coordinated switch.

Figure 3:
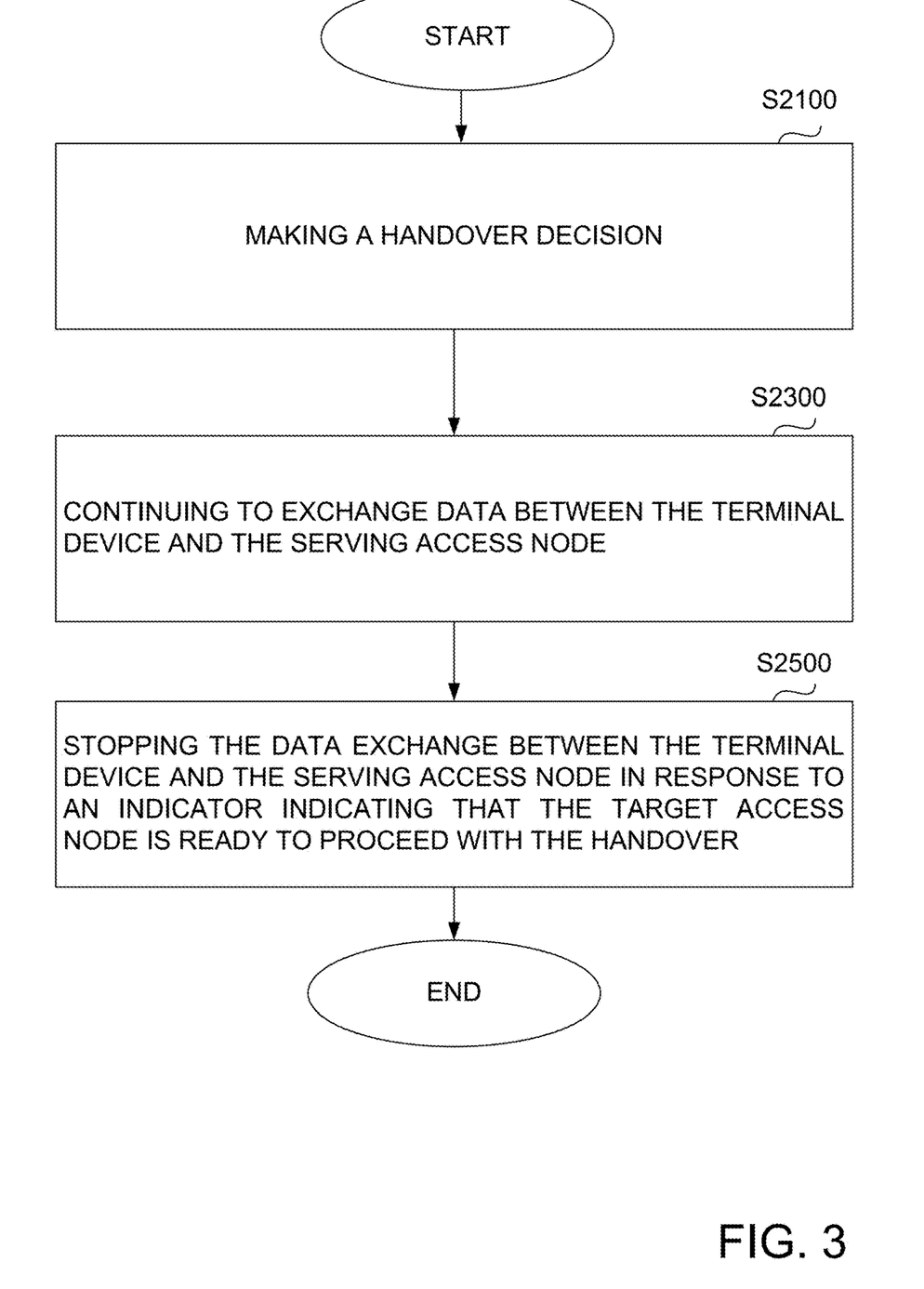
FIG. 3 is a schematic flow diagram illustrating an embodiment of a method for handling data transfer during handover in a terminal device.

FIG. 3 illustrates a flow diagram of a method of handling data transfer during handover according to another embodiment. Here, the method is performed in the terminal device 10 which is initially connected to the serving access node 20 and a data transfer occurs between the terminal device 10 and the serving access node 20. Subsequently a handover is performed so that the terminal device 10 may connect to the target access node 30 and a data transfer occurs between the terminal device 10 and the target access node 30. As such, the terminal device 10 performs the handover of the access connection between the serving access node 20 and the target access node 30.

According to Step S2100 of FIG. 3, a handover decision is made in the terminal device 10. This handover decision may be based on receiving a handover command from an access node, such as the serving access node 20, so that the wireless network controls the handover, as illustrated above. Further, according to step S2300, a data flow between the terminal device 10 and the serving access node 20 is continued, after receiving the handover command, so that the process of data exchange is continued. According to Step S2500 of FIG. 3, this data exchange between the terminal device 10 and the serving access node 20 is stopped in response to the above described indicator indicating that the target access node 30 is (or becomes) ready to proceed with the handover, e.g. that data is or becomes available at the target access node 30. Subsequently, the terminal device 10 connects to the target access node 30 and a data exchange with the target access node 30 is started.

Here, the start of the data exchange with the target access node 30 is performed by the terminal device 10 by, for example, switching to the target access node beam and receiving/transmitting data packets. This connection procedure may be rather fast, since the terminal device 10 may already have performed some of the required steps required during these steps. For example, the terminal device 10 may already have acquired and stored the transmission timing of the target access node 30, and may have received timing advance and the like during the process of making the handover decision.

Figure 10:
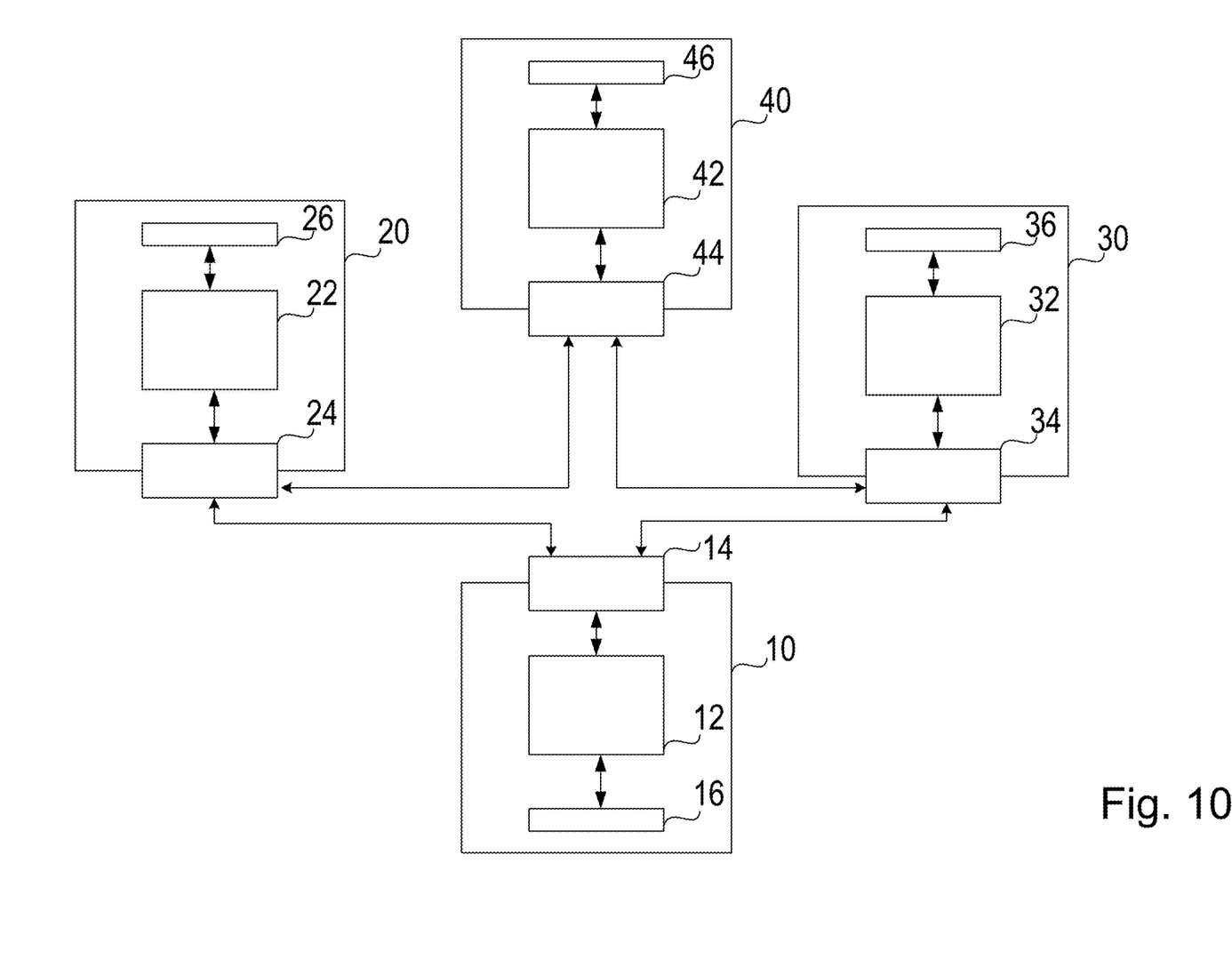
FIG. 10 is a schematic diagram illustrating a terminal device and a serving access node and a target access node, being connected to a code network node, for handling data transfer during handover in a wireless network.

FIG. 10 schematically illustrates the terminal device 10 being accessible via the serving access node 20 and the target access node 30. Here, the first serving access node 20 and the target access node 30 may operate based on a respective first and second type of wireless radio accesses operating with different radio access technologies (dual connectivity scenario, as described above). The radio access network nodes 20, 30 are further illustrated to have a communication connection (wireline or wireless) with a core network node 40 (such as a MME) or another network node, for example operating as an anchor node in the context of RAN internal paging.

The terminal device 10 is provided with a radio transceiver module 14 that provides an air interface to the corresponding radio transceiver modules 24 and 34 of the respective radio access network nodes (eNBs) 20, 30. The radio transceiver modules 14, 24, and 34 may respectively include transmitter circuits, receiver circuits, and associated control circuits that are collectively configured to transmit and receive signals and messages according to a respective different or the same radio access technologies. The network node 40 is provided with a transceiver module 44 that provides the communication connection (wireline or wireless) with the radio access network nodes (eNBs) 20, 30.

As further illustrated in FIG. 10 the terminal device 10, the radio access network nodes 20, 30, and the core network node 40 further comprise a processing module 12, 22, 32, 43, respectively, that are configured to control the radio transceiver module 14, the radio transceiver modules 24 and 34, and the transceiver module 44, respectively. Each of the processing modules 12, 22, 32, 42 comprises one or more processors, e.g. one or more microprocessors, microcontrollers, multi-core processors, or the like. More generally, the processing module(s) may comprise fixed circuitry or programmable circuitry that is specifically configured via the execution of program instructions implementing the functionality taught therein, or may comprise combinations of fixed and programmable circuitry. Each of the processing modules also include and are connected to a respective memory module 16, 26, 36, and 46 respectively. The memory module(s), in some embodiments, store one or more computer programs and, optionally, configuration data. The memory module provides non-transitory storage for the computer program and it may comprise one or more types of computer-readable media, such as disk storage, solid-state memory storage, or any combination thereof. By way of non-limiting example, the memory module may comprise any one or more of SRAM, DRAM, EEPROM, and FLASH memory, which may be in the processing module 12, 22, 32, and 42 respectively and/or separate from the processing module. In general, the memory module comprises one or more types of computer-readable storage media providing non-transitory storage of the computer program and any configuration data used by the terminal device/network node. Here, "non-transitory" means permanent, semi-permanent, or at least temporarily persistent storage and encompasses both long-term storage in non-volatile memory and storage in working memory, e.g., for program execution.

As such, as described above, there are basically three ways that such a coordinated switch between the access network nodes 20 and 30 and the terminal device (UE) 10 may be achieved.

First, the network may provide the information as to performing the coordinated switch to the UE 10 via the source access node 20. Upon reception of this message/indication/command, the UE 10 will stop transmitting/receiving new data from/to the source access node 20 and start receiving data from the target access node 30 after finishing the retransmissions in the source node. Second, the source access node 20 and the UE 10 may follow a synchronized procedure to switch simultaneously the connection, for example by implementing a common timer. Once the timer expires, the source access node 20 stops sending/receiving new data, and the UE 10 starts to listen to the target access node 30 once finishing the retransmissions in the source node. Once data is available in the target access node 30, the target access node 30 initiates the communication. And third, the source access node 20 and the UE 10 may have a first common timer while the target access node 30 may also have a second timer. Once the first timer expires, the source access node stops sending/receiving new data, the UE 10 starts to listen to the target access node 30 once finishing the retransmissions in the source node, and the target node initiates the communication once the second timer expires.

The above second and third mechanisms may be easily combined with an explicit indication according to the first mechanism. For instance, if the second mechanism is used, and data becomes available in the target access node 30 before the time to switch the connection is reached, then an explicit indication may be sent to the UE 10 via the source access node 20 to speed up the process.

The concept of the present invention reduces or eliminates the data interruption during a handover caused by user plane data rerouting without any additional delay to the handover process.

Figure 4:
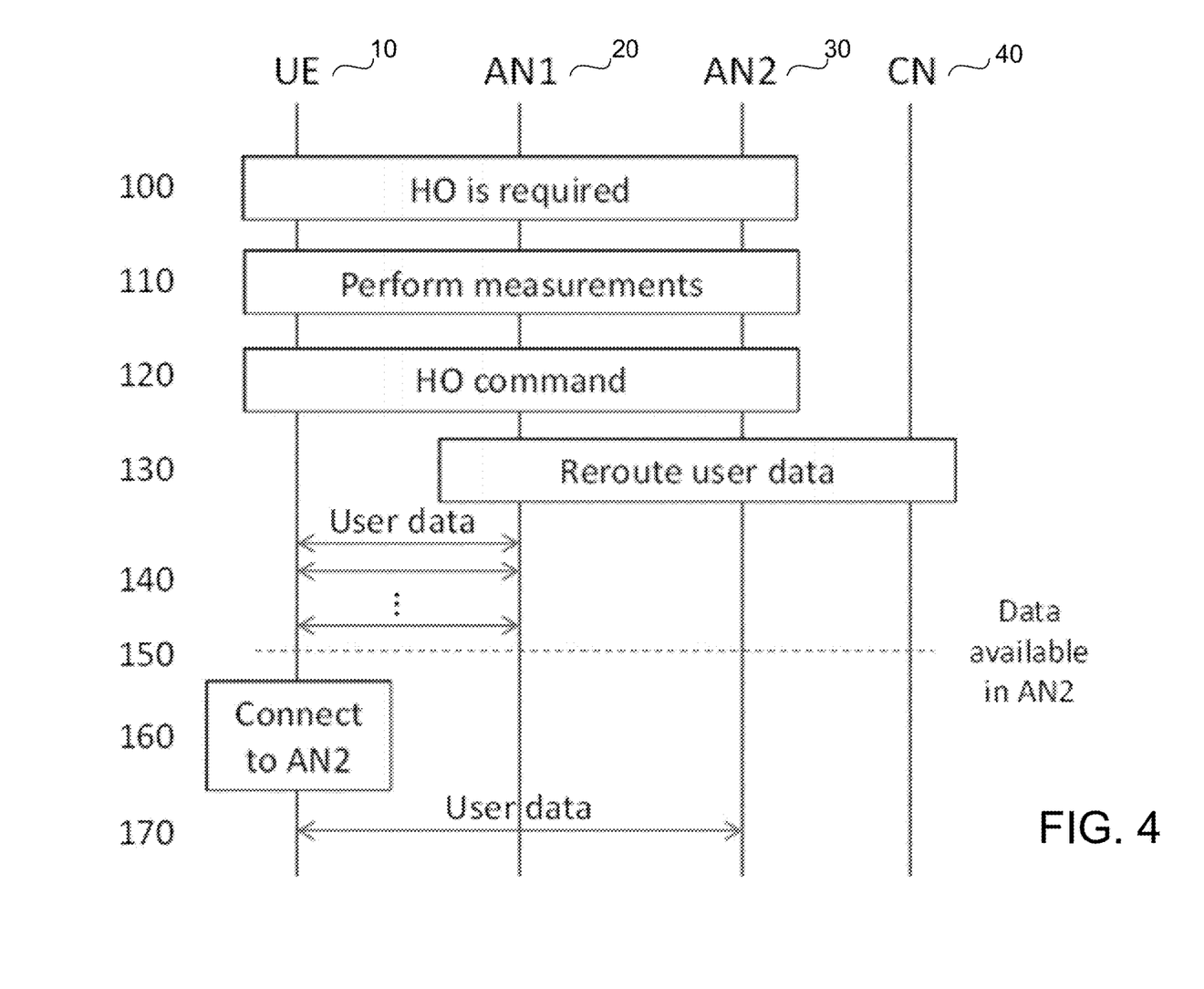
FIG. 4 is a schematic flow diagram illustrating an embodiment of a method for handling data transfer during handover in a wireless network.

As explained above, the concept of the present invention relates to the later parts of a handover procedure, in particular after a handover decision has been made, and further details of the present general principle are illustrated in FIG. 4. As explained above, the involved entities are the terminal device (UE) 10, the source access node AN1 20 and the target access node AN2 30. A handover procedure is initiated when one of the involved entities (UE and/or a network node) decides that a handover is required (step 100). This handover decision is followed by a set of measurements (step 110) and based on these measurements, the network and/or UE makes a handover decision to a certain target access node (AN2) in the network (step 120), where a handover command may be sent either from the source access node 20 or from the target node 30. If the handover decision is made by the UE 10, the handover command (where the term "command" in the present description may refer to a direct command or an indirect command) should be sent from the UE 10 to either access node 20 and 30. Here, however, the case where the networks makes the handover decision and sends the command may be considered as the network controlled handover. The handover command may contain information such as MAC ID and timing advanced (TA), which should be used when communicating with the target access node 30. It is noted that at this point in time, the network and the UE agree on which target access node will be used for the handover. Also, most steps have been taken to prepare both the UE and AN2 for the subsequent data communication. For instance, the UE may have acquired synchronization to AN2, and AN2 may have access to the configuration needed to commence with the data communication, where the latter may be included in the handover command in step 120. These steps are thus performed as part of the handover. Many variants of these earlier steps can be envisioned, and the concept of the present invention may be applied irrespective of which of the UE 10 or the network nodes initiates the handover procedure, how the measurements are performed and which of the UE or the network node makes the handover decision. Here, the early steps may be interpreted as steps preceding the handover decision, and the advantages of the concept of the present invention, i.e. the reduction of data interrupt time, are independent of that.

Further with regard to FIG. 4, when the network realizes, based on the handover decision, that the UE 10 should be handed over to AN2 20, and that user plane data needs to be rerouted, it initiates the user plane data rerouting procedure (step 130). Here, the core network (CN) 40 may also be involved. However, in contrast to state-of-the-art solutions, data communication via AN1 20 continues until the rerouted data is or becomes available in AN2 30, as explained above and further described below. After some time, the user data is available in AN2 (step 150). The UE 10 then stops transmitting/receiving data to and from AN1 and connects to AN2 (step 160). This connection procedure may be rather fast, since the UE 10 may already have performed some of the steps required during steps 110 and 120. For instance, the UE 10 may have acquired and stored the transmission timing of AN2 30 during step 110, as well as received timing advance and other configuration in step 120. Also, AN1 stops transmitting data. The last step in the solution is that AN2 starts transmitting data (step 170).

There may be several ways of performing the data transmission in AN1 20 and for how/when to switch the UE 10 to start communicating via AN2 while the data is being rerouted.

Figure 5:
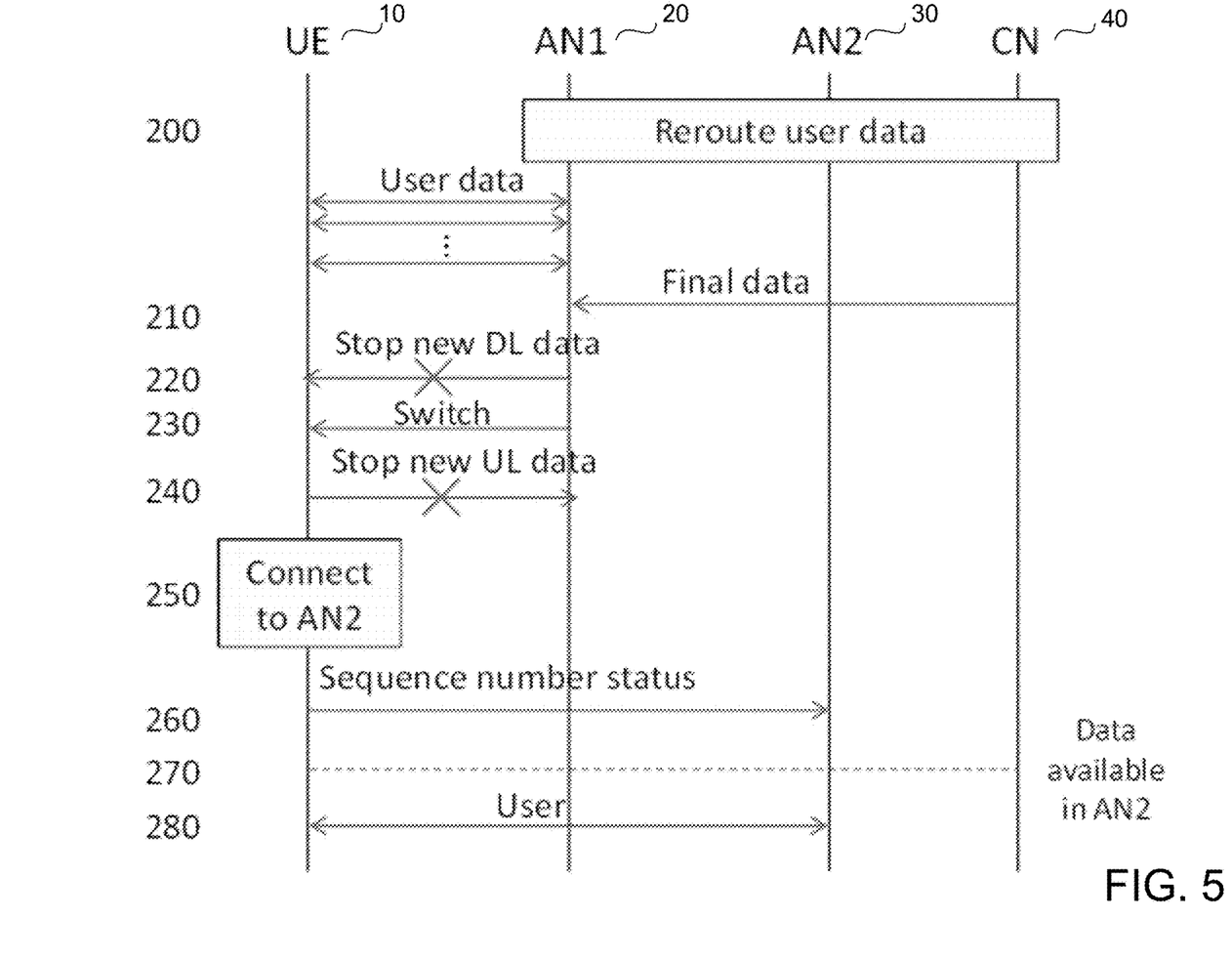
FIG. 5 is a schematic flow diagram illustrating an embodiment of a method for handling data transfer during handover in a wireless network.

In a preferred embodiment, shown in FIG. 5, the CN 40 informs (in step 210) AN1 20 when it will forward no more data to AN1. This signaling element (e.g. the "end marker", as described above) is present already in legacy systems as part of the release of transport network resources between the CN 40 and AN1 10. Upon reception of this final data indictor, AN1 20 stops transmission of new downlink data (step 220) and sends a switch command to the UE (step 230). Upon reception of the switch command from AN1, the UE 10 stops transmission of new uplink data (step 240). After finishing the retransmission(s), the UE 10 connects to AN2 30 (in step 250), and sends to AN2 the (downlink) sequence number status (in step 260), by which AN2 knows from where to resume the (downlink) transmission. The sequence number status could also be sent to AN2 by AN1 (not shown in the figure). After this the UE 10 starts receiving and transmitting data (step 280). Again, the connection procedure is fast, since both the UE and AN2 use previously acquired parameters for the communication.

Figure 6:
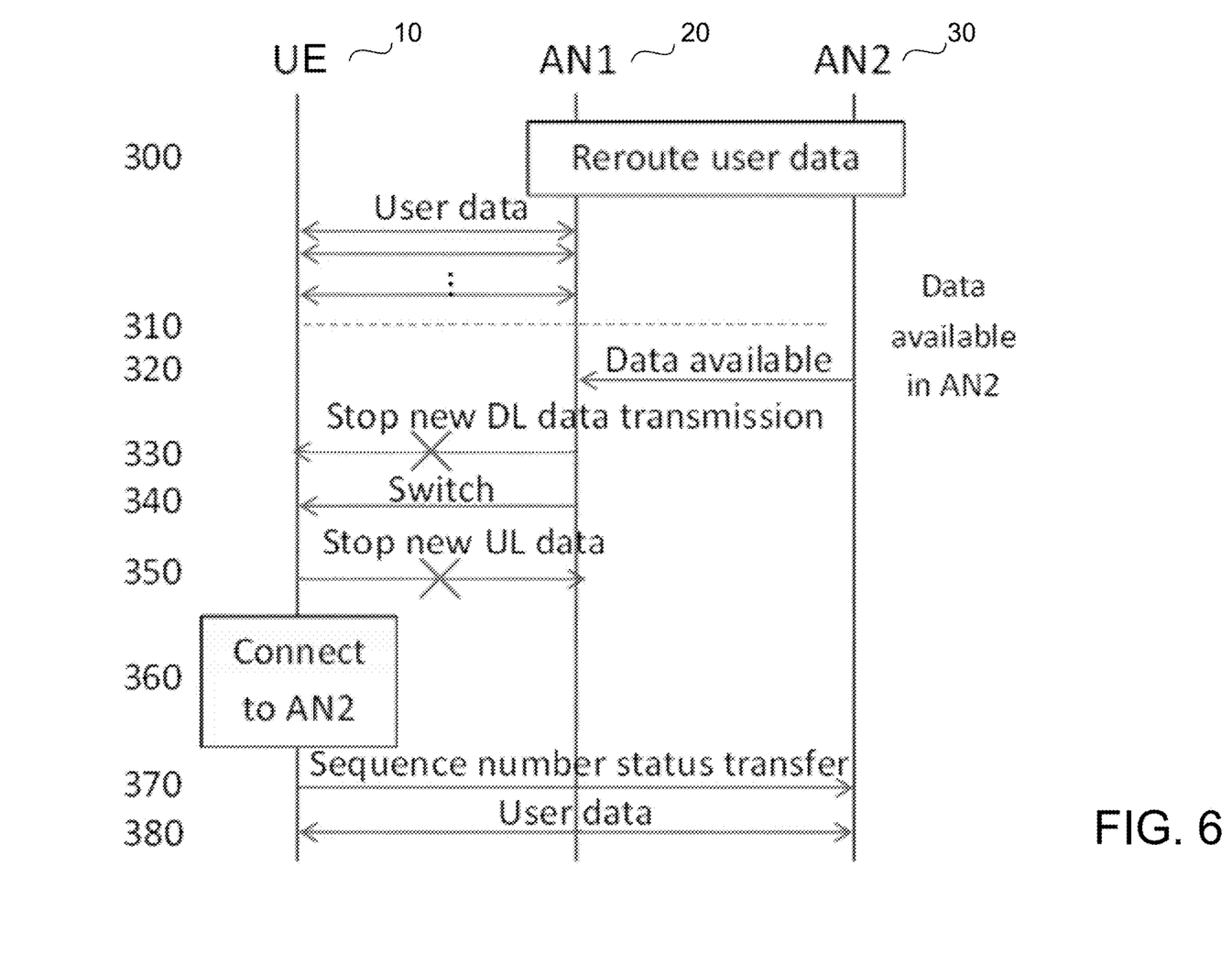
FIG. 6 is a schematic flow diagram illustrating an embodiment of a method for handling data transfer during handover in a wireless network.

According to another preferred embodiment, shown in FIG. 6, the AN2 30 informs (in step 320) the AN1 20 when AN2 has data available for transmission to the UE, for example as soon as AN2 has received one packet for the UE10. The AN1 20 in turn stops transmission of new downlink data (in step 330) to the UE 10 and sends a switch command to the UE (340). Upon reception of the switch command from AN1, the UE 10 stops transmission of new uplink data (in step 350). After finishing the retransmission(s), the UE connects to AN2 (step 360), and sends to AN2 the (downlink) sequence number status (step 370), by which AN2 knows from where to resume the (downlink) transmission. The sequence number status could also be sent by AN1 20 (not shown in the figure). After this the UE 10 starts receiving and transmitting data (step 380). Again, the connection procedure is fast, since both the UE and AN2 30 use previously acquired parameters for the communication. Note that there is no direct CN involvement in this preferred embodiment.

Figure 7:
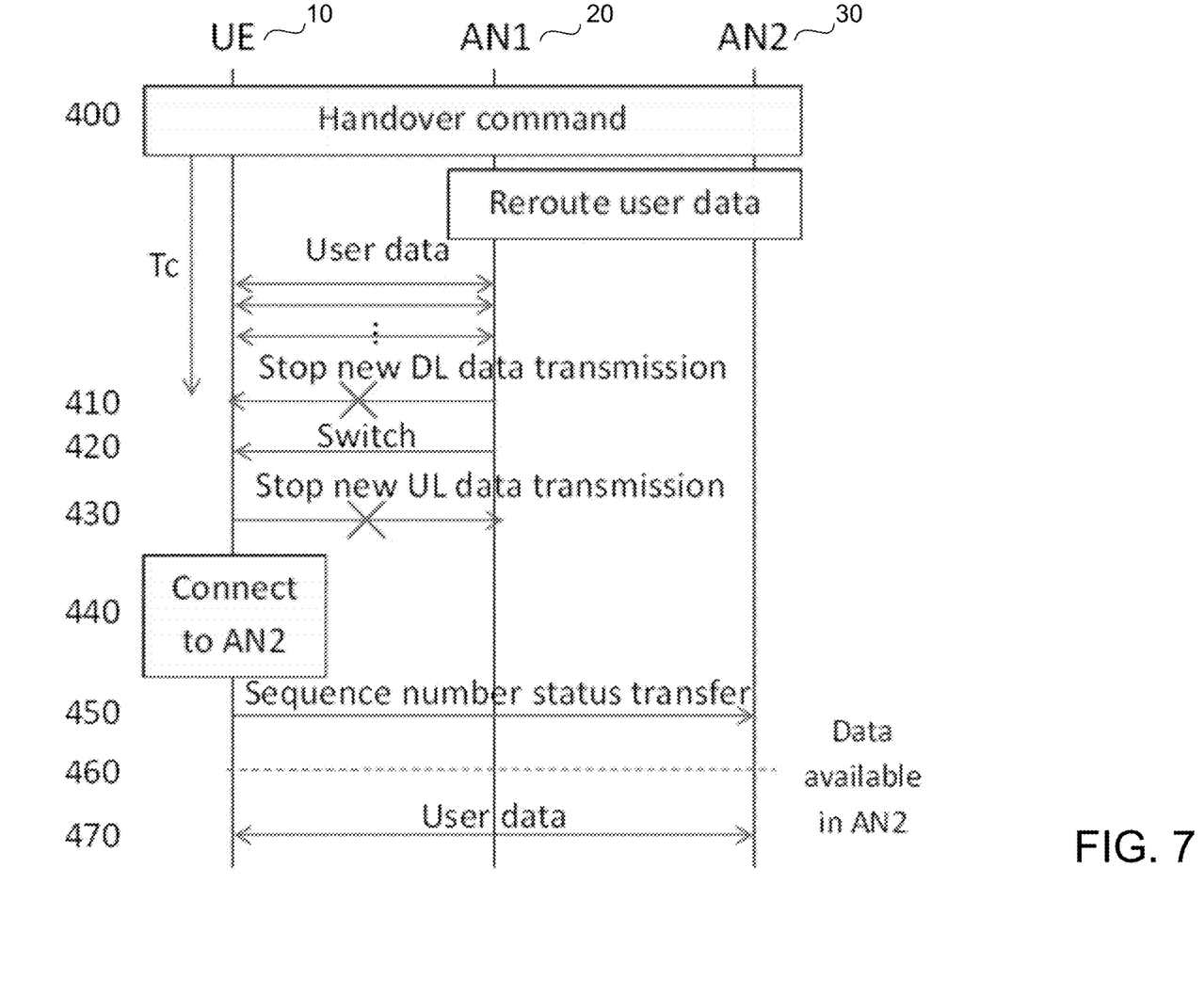
FIG. 7 is a schematic flow diagram illustrating an embodiment of a method for handling data transfer during handover in a wireless network.

According to another preferred embodiment, shown in FIG. 7, there may be provided a (first) timer Tc running in AN1 20. The AN1 20 starts the timer Tc when the handover command is transmitted to or from the UE (step 400). As long as the timer is running, the AN1 10 continues to send data to the UE 10 in downlink while the UE 10 also sends data to AN1 20 in uplink. When the (first) timer expires, AN1 20 stops sending new data (step 410) to the UE 10 and sends a switch command to the UE (step 420).

In general, suitable values for the used timer (described here and below) should match the delays that can be expected in the transport network together with the delays associated with the signaling to perform the rerouting of data (which may involve the core network), e.g. the path switch. Hence, the values for Tc are similar/associated to/with the delay that can be expected for the user plane rerouting. While using such values a priori may be difficult, the timer values may be dynamically changed/updated and configured, which can be adaptively changed based on backhaul properties, or based on whether there is a fast quality drop in the source node. The (updated) timer value(s) may further be transmitted (e.g. also for a subsequent handover) in the switch or handover command.

Further according to the preferred embodiment shown in FIG. 7, when the UE 10 receives the switch command, it stops sending the new data to the network in uplink (step 430). Similar as in the previous embodiment, once finishing the retransmission(s) in uplink and downlink, the UE 10 connects to AN2 (in step 440) and sends to AN2 30 the (downlink) sequence number status (450). When data has arrived in AN2 (step 460), it starts transmitting data towards the UE (step 470).

Figure 8:
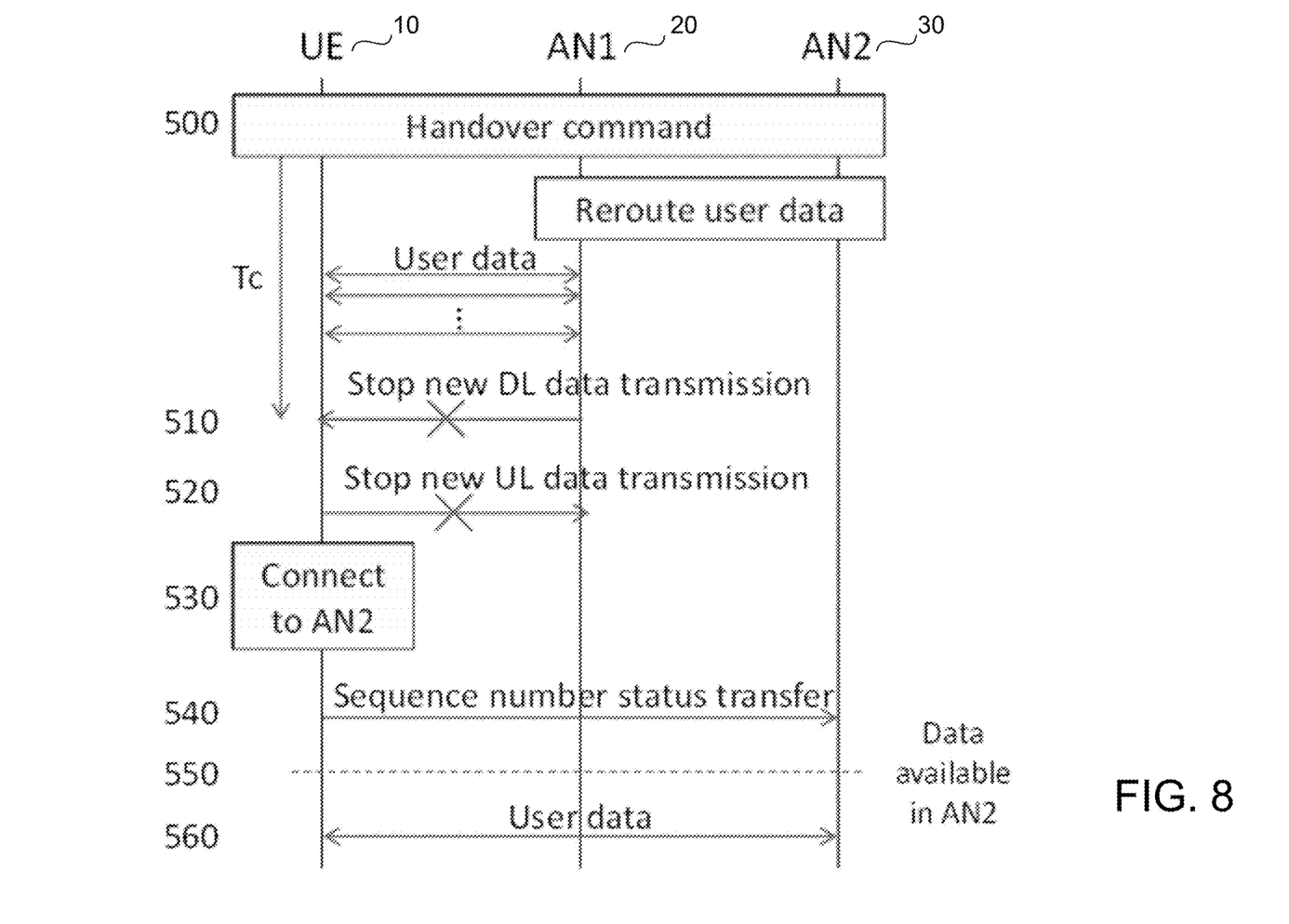
FIG. 8 is a schematic flow diagram illustrating an embodiment of a method for handling data transfer during handover in a wireless network.

In another preferred embodiment, as shown in FIG. 8, the switch command from AN1 20 (step 420 in FIG. 7) may be avoided by having a (common) timer Tc running in the UE as well. The (common) timer in the UE 10 may be configured/started with the handover command (in step 500). Hence there is a (common) timer Tc running in AN1 20 and in the UE 10. The AN1 20 starts the timer when the command is transmitted (step 500), and the UE 10 starts the timer when the handover command is received. When the timer expires in AN1 20, the AN1 stops transmitting new data towards the UE 10 in downlink (step 510), and when the timer expires in the UE 10, the UE also stops transmitting new data towards the network in uplink (step 520). Once finishing the retransmission(s) in uplink and downlink, the UE 10 connects to AN2 (step 530) and sends to AN2 the (downlink) sequence number status (step 540). When data becomes available in AN2 (step 550), it starts transmitting and receiving data towards the UE 10 (step 560). The expiration time of the timer in the UE 10 and in the AN1 20 may be set to be synchronized according to a common time reference system in order to expire at the same time or by calculating possible misalignments in advance. Alternatively, the common timer in the UE 10 and the AN1 20 may be set according to a fixed elapsing value (having different values for different handovers) that might result in a negligible misalignment, which does not affect the rest of the procedure sequence. In other words, the two timers in the UE 10 and the AN1 20 run independently in this alternative embodiment, and there is no explicit mechanism to adjust the misalignment.

Figure 9:
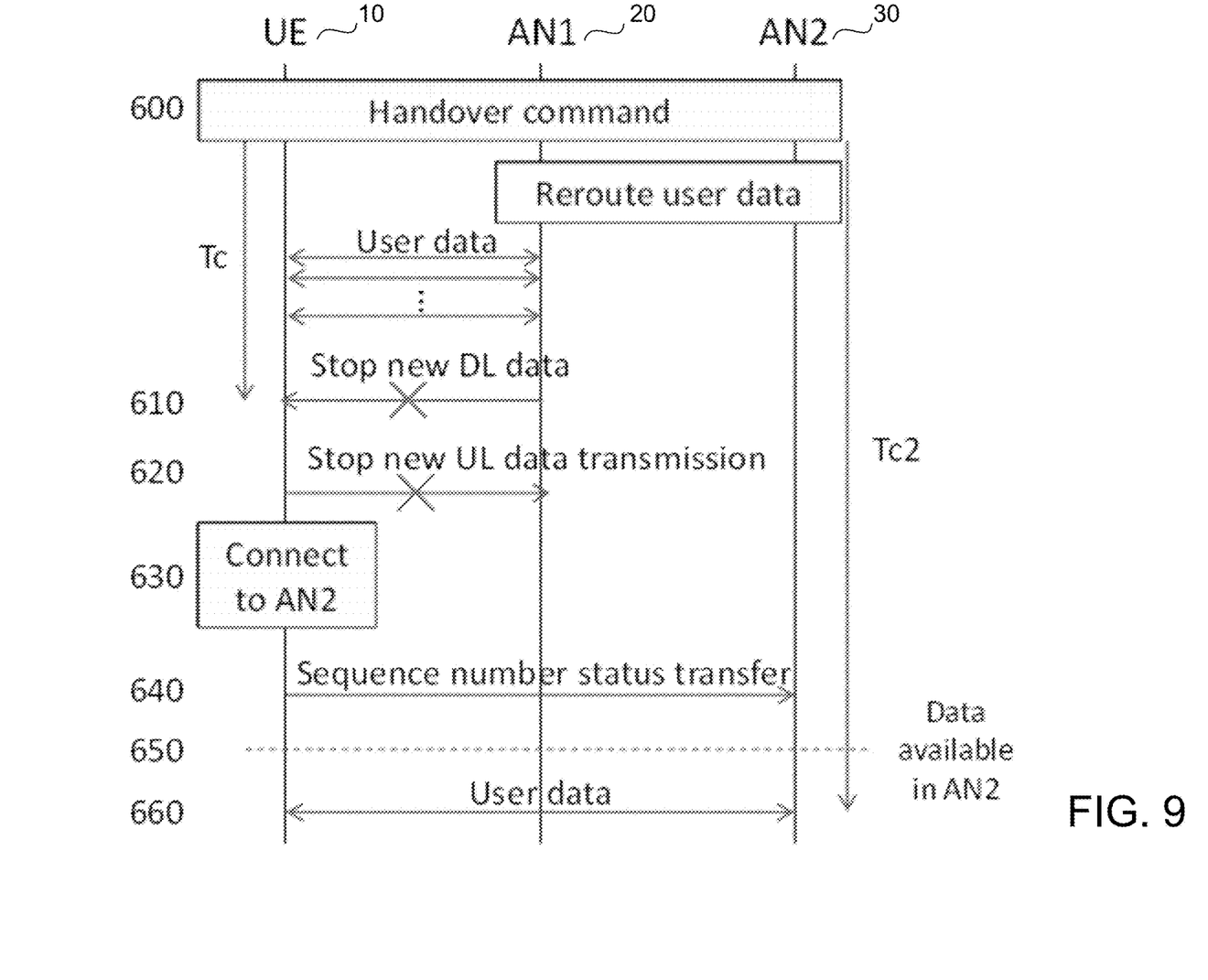
FIG. 9 is a schematic flow diagram illustrating an embodiment of a method for handling data transfer during handover in a wireless network.

In another preferred embodiment, as shown in FIG. 9, a timer is introduced in the AN2 30 as well. By choosing a value for the AN2 timer which is larger than the value of the AN1 timer, it is possible to ensure that no data is transmitted towards the UE 10 before the UE is ready to receive it. The network provides a timer to the UE 10 as part of the handover command. The AN1 starts the timer Tc when the handover command is transmitted (step 600), and the UE 10 starts the timer when the handover command is received (600). In addition, AN2 starts the timer Tc2 when the handover command is transmitted (step 600). When the timer expires in AN1 20, it stops transmitting new data in downlink (step 610), and when the timer expires in the UE 10, the UE also stops transmitting new data in uplink (step 620). Once finishing the retransmission(s) in uplink and downlink, the UE 10 connects to AN2 (step 630) and starts listening for data from the AN2 30. Once connected to AN2 30, the UE 10 sends to AN2 the (downlink) sequence number status (step 640). When data is available in AN2 (step 650) and the timer Tc2 expires in AN2 30, AN2 starts transmitting data to the UE (step 660). Ideally, the time difference between steps 640 and 660 is as short as possible. Tc2 makes it possible to prevent that AN2 starts transmitting data too early, while still avoiding any explicit signaling.

It is further noted that the data availability signaling (Step 210 in FIG. 5 and step 320 in FIG. 6) and timer approaches (according to FIGS. 7-9) may be readily combined. In this way, a timer may be set as described above (such as based on the steps 400, 500, or 600), but if the data rerouting process completes and data becomes available at the AN2 30 before the timer expires, the AN1 or alternatively the AN2 may inform the UE 10 to immediately stop new data transmission/reception and switch to using AN2 for data transmissions and reception once finishing retransmission(s) in AN1 20.

The above described embodiments thus allow continuing data communication in the serving access node 20 while data is rerouted to new target access node 30.

The above respective modules may be implemented by a processing unit that include one or a plurality of processors, a microprocessor or other processing logic that interprets and executes instructions stored in a main memory, i.e. memory modules 16, 26, 36, and 46. The main memory may include a RAM or other type of dynamic storage device that may store information and instructions for execution by the respective modules/units. For example, the radio transceiver modules 14, 24 and 34 and the corresponding processing module 12, 24 and 34 as well as the transceiver module 44 and the corresponding processing module 42 discussed above with respect to FIG. 10 may be realized by the processing unit/processor. The ROM may include a ROM device or another type of static storage device that may store static information and instructions for use by the processing unit.

As mentioned above, the radio access (serving and target) network nodes (base stations) 20 and 30 as well as the terminal device 10 and the core network node 40 may perform certain operations or processes (data rerouting, continuing and stopping data exchange, handover decision making, etc.) described herein. These operations may be performed in response to the processing unit/processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the base stations 20 and 30 as well as the terminal device 10 and the core network node 40 may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements/modules/units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

The invention claimed is:

1. A method of handling data transfer during handover of a terminal device between a serving access node and a target access node in a wireless network, the method comprising:

upon making a handover decision, performing data rerouting to the target access node while continuing to exchange data between the terminal device and the serving access node;

upon making the handover decision, establishing a first timer between the terminal device and the serving access node, wherein first timer comprises a common timer in which the expiration time of the common timer is synchronized between the terminal device and the serving access node;

stopping the data exchange between the terminal device and the serving access node in response to an indicator indicating that the target access node is ready to proceed with the handover; and transmitting, from the serving access node, a switch command to the terminal device in response to the indicator which is received prior to the expiration time of the common timer that is synchronized between the terminal device and the serving access node.

2. The method according to claim 1, wherein the indicator comprises a first indicator comprising signaling from the target access node to the serving access node or from a core network node to the serving access node.

3. The method according to claim 1, wherein the indicator comprises a second indicator provided by the first timer.

4. The method according to claim 3, further comprising providing a second timer in the target access node.

5. The method according to claim 1, further comprising: transmitting a third indicator to the terminal device to abort the handover process.

6. The method of claim 1, further comprising:
transmitting, to the target access node from the serving access node, a sequence number status informing the target access node from where to resume downlink transmissions of the data exchange.

7. A method of handling data transfer during access node handover in a terminal device, the method comprising:
upon making a handover decision, continuing to exchange data between the terminal device and a serving access node;
upon making the handover decision, establishing a first timer between the terminal device and the serving access node, wherein first timer comprises a common timer in which the expiration time of the common timer is synchronized between the terminal device and the serving access node;
stopping data exchange between the terminal device and the serving access node in response to an indicator indicating that the target access node is ready to proceed with the handover;
receiving, from the serving access node, the indicator prior to the expiration time of the common timer that is synchronized between the terminal device and the serving access node; and
wherein the indicator comprises a first indicator that is a switch command.

8. The method according to claim 7, wherein the indicator comprises a second indicator provided by the first timer.

9. The method according to claim 7, further comprising: receiving a third indicator to abort the handover process.

10. The method of claim 7, further comprising:
transmitting, to the target access node, a sequence number status informing the target access node from where to resume downlink transmissions of the data exchange.

11. A terminal device, comprising:
a processor;
a radio transceiver; and
a memory, the memory containing instructions executable by the processor that when executed by the processor, causes the processor to operate to:
upon making a handover decision, continue to exchange data between the terminal device and a serving access node,
upon making the handover decision, establish a first timer between the terminal device and the serving access node, wherein first timer comprises a common timer in which the expiration time of the common timer is synchronized between the terminal device and the serving access node;
stop data exchange between the terminal device and the serving access node in response to an indicator indicating that the target access node is ready to proceed with the handover,
receive, from the serving access node, the indicator prior to the expiration time of the common timer that is synchronized between the terminal device and the serving access node, and
wherein the indicator comprises a first indicator that is a switch command.

12. A network node, comprising:
a transceiver;
a processor; and
a memory, the memory containing instructions executable by the processor that when executed by the processor, causes the processor to operate to:
upon making a handover decision, perform data rerouting to the target access node while continuing to exchange data between the terminal device and the serving access node,
upon making the handover decision, establish a first timer between the terminal device and the serving access node, wherein first timer comprises a common timer in which the expiration time of the common timer is synchronized between the terminal device and the serving access node;
stop the data exchange between the terminal device and the serving access node in response to an indicator indicating that the target access node is ready to proceed with the handover, and
transmit, from the serving access node, a switch command to the terminal device in response to the indicator which is received prior to the expiration time of the common timer that is synchronized between the terminal device and the serving access node.

* * * * *